United States Patent [19]

Haake

[11] Patent Number: 5,553,182

[45] Date of Patent: Sep. 3, 1996

[54] ALIGNMENT FIXTURE AND ASSOCIATED METHOD FOR CONTROLLABLY POSITIONING ON OPTICAL FIBER

[75] Inventor: John M. Haake, St. Charles, Mo.

[73] Assignee: McDonnell Douglas Corporation, St. Louis, Mo.

[21] Appl. No.: 388,609

[22] Filed: Feb. 14, 1995

[51] Int. Cl.$^6$ ........................................ G02B 6/36
[52] U.S. Cl. ................ 385/89; 385/88; 385/90; 385/91; 385/50; 385/49
[58] Field of Search .................. 385/88–94, 49, 385/50, 52, 14, 15, 137, 83, 80; 219/78.01, 85.13, 85.2, 85.21, 86.9, 87

[56] References Cited

U.S. PATENT DOCUMENTS

| | | | |
|---|---|---|---|
| 4,357,072 | 11/1982 | Goodfellow et al. | 385/91 |
| 4,523,802 | 6/1985 | Sakaguchi et al. | 385/91 |
| 4,701,013 | 10/1987 | Jurczyszyn et al. | 385/15 |
| 4,702,547 | 10/1987 | Enochs | 385/88 |
| 4,741,796 | 5/1988 | Althaus | 156/273.5 |
| 4,796,975 | 1/1989 | Lukas et al. | 385/50 |
| 4,798,439 | 1/1989 | Preston | 385/91 |
| 4,802,727 | 2/1989 | Stanley | 385/89 |
| 4,867,524 | 9/1989 | Courtney et al. | 385/14 |
| 4,955,683 | 9/1990 | Shiga et al. | 385/88 |
| 5,247,597 | 9/1993 | Blacha et al. | 385/88 |
| 5,412,748 | 5/1995 | Furuyama et al. | 385/92 |

FOREIGN PATENT DOCUMENTS

| | | |
|---|---|---|
| 2128768 | 8/1983 | United Kingdom. |
| 2146841 | 8/1984 | United Kingdom. |

OTHER PUBLICATIONS

Trends–Fiber Optics, Bulletin 1501, *Photonics Spectra*, Mar. 1988.

High Gain (21 dB) Packaged Semiconductor Optical Amplifiers, *Electronics Letters*, vol. 27, No. 20, Sep. 26, 1991, pp. 1842–1843.

Fiber Attachment For Guided Wave Devices, *Journal of Lightwave Technology*, vol. 6, No. 6, Jun. 1988, pp. 862–871.

High Reliability Packaging For Fibre Optic Sources, *SPIE*, vol. 717 Reliability Considerations In Fiber Optic Applications, 1986, pp. 63–73. (no month).

*Primary Examiner*—Rodney B. Bovernick
*Assistant Examiner*—Hemang Sanghavi
*Attorney, Agent, or Firm*—Bell, Seltzer, Park & Gibson, P.A.

[57] ABSTRACT

An optical fiber alignment assembly including an alignment fixture for controllably positioning an optical fiber including an optical fiber carrier defining at least one channel extending inwardly from a first surface of the optical fiber carrier which is adapted for receiving an optical fiber. The optical fiber carrier also defines at least one passageway from a second surface of the optical fiber carrier, opposite the first surface, to each channel. The passageway is at least partially filled with a thermal transfer material and an optical fiber bonding material is disposed within the channel and is adapted to bond an optical fiber to the optical fiber carrier. The optical fiber bonding material has a predetermined melting temperature such that by applying heat to the thermal transfer material, the optical fiber bonding material becomes at least partially malleable. Once the optical fibers are properly positioned in the malleable optical fiber bonding material, the thermal energy can be removed from the thermal transfer material such that the optical fiber bonding material resolidifies and fixes the position of the optical fiber. The optical fiber bonding material disposed in the channels adjacent to the heated channel can be cooled to prevent undesirable movement of the optical fibers in the adjacent channels.

21 Claims, 3 Drawing Sheets

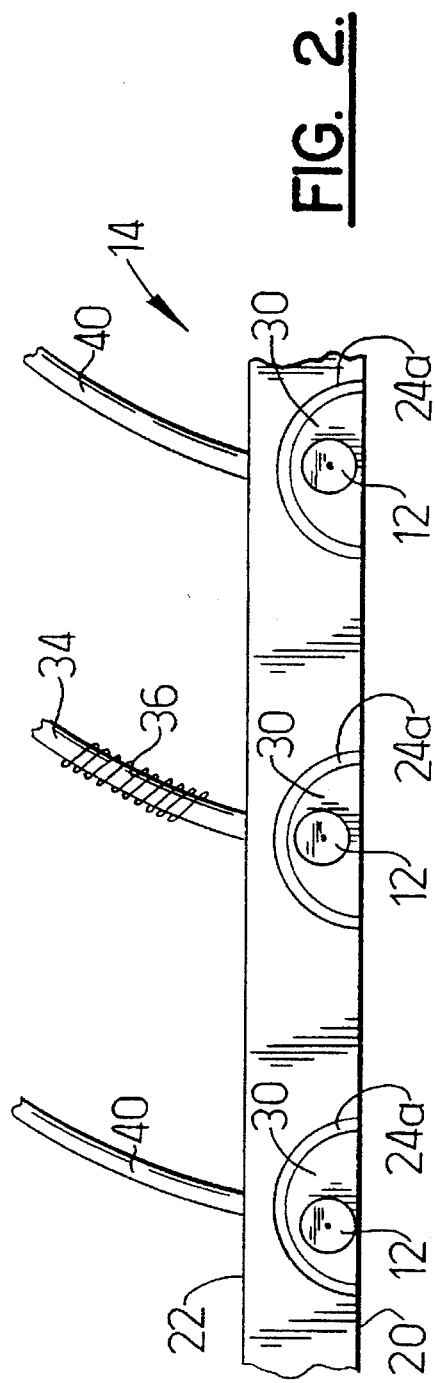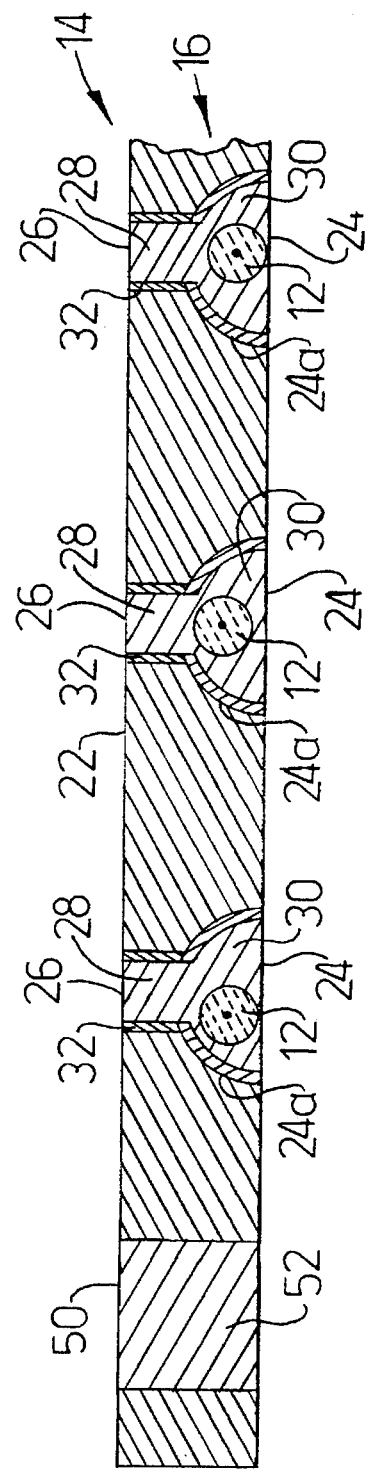

ALIGNMENT FIXTURE AND ASSOCIATED METHOD FOR CONTROLLABLY POSITIONING ON OPTICAL FIBER

FIELD OF THE INVENTION

The present invention relates generally to alignment fixtures and associated methods and, more particularly, to alignment fixtures and associated methods for controllably positioning optical fibers.

BACKGROUND OF THE INVENTION

It is oftentimes desirable to align optical fibers with an electro-optic device, such as optical waveguides or other light sources. Such alignment is particularly desirable in order to maximize the percentage of light coupled from the light source or electro-optic device to the optical fiber and to thereby increase the transmission efficiency of the optical signals. However, the alignment of optical fibers is complicated by the relatively small sizes of both the optical fiber waveguide which, for example, can have a light transmitting core diameter of approximately 4 micrometers and the light source, such as an electro-optic device including an optical waveguide, which has approximately the same size.

Furthermore, it is often desirable to align not just one optical fiber, but numerous optical fibers with one or more light sources. For example, a plurality of optical fibers must commonly be aligned with respective ones of the plurality of optical waveguides of an electro-optic device. In these instances, the alignment of the optical fibers is typically further complicated by the relatively small lateral spacing between the optical fibers. Due to the relatively small lateral spacing between the optical fibers, the alignment of a first optical fiber can affect the positioning of adjacent optical fibers, thereby potentially misaligning the adjacent optical fibers.

In addition, the process of aligning optical fibers with respective optical waveguides is preferably readily repeatable to provide for mass production capabilities. However, the repeatability of conventional optical fiber alignment processes is diminished by the large number of optical fibers which must be intricately positioned for proper alignment. Notwithstanding these further difficulties in alignment, there is an increasing demand for methods and apparatus to align a plurality of closely spaced optical fibers, such as optical fibers having a lateral spacing of less than 500 micrometers, due to advances in technology which have led to significant reductions in the size of electro-optical devices, Various methods have been proposed to align a single optical fiber with a variety of electro-optic devices. See, for example, U.S. Pat. No. 4,955,683 which was issued Sep. 11, 1992, to Nobuo Shiga, et al. and is assigned to Sumitomo Electric Industries, Ltd.; U.S. Pat. No. 4,798,439 which was issued Jan. 17, 1989, to Keith Preston and is assigned to British Telecommunications, PLC; U.S. Pat. No. 4,741,796 which was issued May 3, 1988, to Hans Althaus, et al. and is assigned to Siemens Aktiengesellschaft; U.S. Pat. No. 4,702,547 which was issued Oct. 27, 1987, to R. Scott Enochs and is assigned to Tektronix, Inc.; U.K. Patent Application GB 2,128,768 which was published May 2, 1984, and is assigned to Hitachi Ltd.; and U.K. Patent Application GB 2,146,841 which was published Apr. 24, 1985, and is assigned to Hitachi Ltd.

As illustrated by these patents and known to those skilled in the art, individual metallized optical fibers can be soldered to a support. In order to position the optical fiber, the solder bonding the metallized optical fiber to the support is generally heated to a temperature above the predetermined melting temperature of the solder. Thereafter, the optical fiber can be moved and, once the optical fiber is properly positioned, the solder can be allowed to cool and resolidify to fix the position of the optical fiber relative to the support and, more importantly, to a light source.

In particular, U.S. Pat. No. 4,798,439 to Keith Preston (hereinafter the "'439 patent") describes an optical assembly and a related method for mounting optical components, such as an optical fiber, on a substrate. According to the '439 patent, an optical fiber is lowered into a layer of solder, such as a solder preform or a solder paste, which has been applied to a submount assembly. Thereafter, a heating element is lowered into contact with the solder to locally melt the solder about the optical fiber such that the optical fiber can be mounted therein. During the mounting process, a first end of the optical fiber is positioned to receive the output of a laser, also illustratively mounted on the submount assembly. By positioning the optical fiber such that the power level of the light transmitted through the optical fiber is maximized, the optical fiber is appropriately aligned with the laser. Once aligned, the heating element is cooled to allow the solder to solidify and to fix the optical fiber to the submount assembly.

Another method of positioning an optical fiber is described in U.S. Pat. No. 4,741,796 to Hans Althaus, et al. (hereinafter the "'796 patent"). In particular, the '796 patent describes a method for aligning an optical fiber with a laser diode. According to this method, an electrically conductive body having a groove defined therein is bonded to a base. An optical fiber extends through the groove and is bonded to the electrically conductive body with a bonding agent. By inducing current flow through the electrically conductive body, the temperature of the electrically conductive body is increased such that the optical fiber is positionable within the bonding agent. After properly positioning the optical fiber relative to the laser diode, the current flow is stopped to cool and solidify the bonding agent, thereby fixing the position of the optical fiber. However, neither the '439 patent nor the '796 patent describes a method or apparatus for attaching a plurality of laterally spaced optical fibers to a fixture and for thereafter individually aligning the plurality of optical fibers.

SUMMARY OF THE INVENTION

It is therefore an object of the present invention to provide an improved alignment fixture and an associated method for controllably positioning an optical fiber.

It is another object of the present invention to provide an alignment fixture and an associated method for controllably positioning a plurality of optical fibers having a relatively small lateral spacing between fibers.

It is a further object of the present invention to provide an alignment fixture and an associated method for controllably positioning one optical fiber of a plurality of laterally spaced optical fibers without adversely affecting the alignment of the adjacent optical fibers.

It is still a further object of the present invention to provide an improved method of mounting and aligning a plurality of optical fibers in an alignment fixture which is readily repeatable in a mass production environment.

These and other objects are provided, according to the present invention, by an alignment fixture and an associated method for controllably positioning an optical fiber, such as a metallized optical fiber. The alignment fixture includes an optical fiber carrier defining at least one channel extending thereacross. The channel extends inwardly from a first surface of the optical fiber carrier and defines a longitudinal axis. Typically, the channel is coated with a metallic adhesion layer. The optical fiber carrier also defines at least one passageway from a second surface of the optical fiber carrier, opposite the first surface, to the channel. A thermal transfer material, such as a copper tab, is disposed within the passageway defined in the optical fiber carrier. In addition, an optical fiber bonding material, such as solder, is disposed within the channel and is adapted for bonding an optical fiber to the optical fiber carrier.

The optical fiber bonding material has a predetermined melting temperature such that the optical fiber bonding material is at least partially malleable at temperatures above the predetermined melting temperature and is solid at temperatures below the predetermined melting temperature. Accordingly, the position of the optical fiber within the optical fiber bonding material is fixed when the optical fiber bonding material is solidified and is adjustable when the optical fiber bonding material is at least partially malleable.

The optical fiber bonding material is in thermal contact with the thermal transfer material. Therefore, the temperature and, thus, the malleability of the optical fiber bonding material is controlled by thermal energy applied to the thermal transfer material. More particularly, by heating the thermal transfer material to a temperature above the predetermined melting temperature of the optical fiber bonding material, the optical fiber bonding material becomes at least partially malleable and the optical fiber disposed therein can be controllably positioned. Once appropriately positioned, the thermal energy can be removed from the thermal transfer material such that the optical fiber bonding material cools and solidifies, thereby fixing the position of the optical fiber.

According to one embodiment, the optical fiber carrier defines a plurality of laterally spaced, longitudinally extending channels for receiving respective ones of a plurality of optical fibers. The optical fiber carrier of this embodiment also defines a plurality of passageways, at least one of which extends from the second surface of the optical fiber carrier to each of the plurality of channels. The thermal transfer material can, in turn, be adhered to the sidewalls of each passageway with an adhesive material having a melting temperature greater than the predetermined melting temperature of the optical fiber bonding material.

According to another embodiment of the present invention, the alignment assembly is a portion of an optical fiber alignment assembly. The optical fiber alignment assembly of this embodiment also includes heating means for supplying thermal energy to the thermal transfer material to thereby heat the thermal transfer material and the optical fiber bonding material above the predetermined melting temperature of the optical fiber bonding material. The optical fiber alignment assembly also includes positioning means for controllably positioning the optical fiber within the channel defined in the optical fiber carrier while the optical fiber bonding material is at least partially malleable.

According to one embodiment, the optical fiber alignment assembly also includes cooling means, positioned in thermal contact with the thermal transfer material in the passageway adjacent to the passageway which the heated thermal transfer material is disposed. The cooling means maintains the temperature of the optical fiber bonding material in the channel adjacent to the channel containing the heated optical fiber bonding material below the predetermined melting temperature of the optical fiber bonding material. Thus, the optical fiber bonding material in the channel with which the cooling means is in thermal contact remains solidified and the position of the optical fiber remains fixed therein during the positioning of an adjacent optical fiber.

Accordingly, the optical fiber bonding material disposed in a first channel can be heated to a temperature above its predetermined melting temperature such that the optical fiber bonding material is at least partially malleable. Simultaneous with the heating of the optical fiber bonding material in the first channel, the optical fiber bonding material disposed in a second channel, laterally adjacent to the first channel, is cooled. Thus, the optical fiber bonding material disposed in the second channel remains solidified.

While the optical fiber bonding material within the first channel is at least partially malleable, the optical fiber disposed therein is positioned. Thereafter, the optical fiber bonding material disposed within the first channel can be cooled and resolidified to fix the position of the optical fiber therein.

Furthermore, the optical fiber bonding material disposed within a third channel, also laterally adjacent to the first channel and opposite the second channel, can be cooled such that the optical fiber bonding material disposed in the third channel remains solidified. Accordingly, an optical fiber can be controllably positioned within a first channel while the relative positions of optical fibers in adjacent channels are unaffected, even if the channels are relatively closely spaced.

The optical fiber alignment assembly also preferably includes light source means for providing an optical signal to the optical fiber. The light source means is preferably positioned at a fixed, aligned location relative to the optical fiber carrier. The optical fiber alignment assembly of this embodiment also preferably includes a detector for receiving the optical signal following its propagation through the optical fiber and for detecting the strength of the signal. In response to the detected optical signal, the positioning means preferably includes means for adjusting the position of the optical fiber to thereby increase the detected strength of the received light signal. Accordingly, the alignment of the optical fiber relative to a fixed light source can be optimized to increase optical signal transmission efficiency.

The optical fiber alignment assembly can also include a heatsink. According to this embodiment, the optical fiber carrier preferably defines at least one bore extending from the first side to the opposed second side. Each bore is adapted for receiving an adhesive material to bond the alignment fixture to the heatsink.

According to another aspect of the present invention, a method is provided for fabricating an alignment fixture from a substrate having opposed first and second surfaces. According to this aspect, a plurality of inwardly extending passageways are initially formed from the second surface of the substrate. The plurality of passageways are then at least partially filled with a thermal transfer material which has a greater thermal conductivity than the substrate. A plurality of inwardly extending channels are thereafter cut from the first surface of the substrate. The plurality of channels are positioned such that at least one of the passageways filled with the thermal transfer material opens into each channel. Finally, an optical fiber and an optical fiber bonding material are disposed in each channel such that the optical fiber bonding material is in thermal contact with the thermal transfer material.

The substrate can then be mounted on a heatsink, such as by filling the bores defined therethrough, at least partially, with an adhesive material. Preferably, the substrate is mounted on the heatsink such that the first surface of the substrate disposed in the respective channels are positioned is adjacent to the heatsink and the optical fibers between the substrate and the heatsink.

BRIEF DESCRIPTION OF THE DRAWINGS

FIG. 2 is a front elevational view of an optical fiber alignment assembly according to the present invention illustrating a heating probe and two cooling probes.

FIG. 3 is a lateral cross-sectional view of the optical fiber carrier of the alignment fixture of the present invention.

DETAILED DESCRIPTION OF THE PREFERRED EMBODIMENTS

The present invention will now be described more fully hereinafter with reference to the accompanying drawings, in which a preferred embodiment of the invention is shown. This invention may, however, be embodied in many different forms and should not be construed as limited to the embodiments set forth herein; rather, this embodiment is provided so that this disclosure will be thorough and complete and will fully convey the scope of the invention to those skilled in the art. Like numbers refer to like elements throughout.

Figure 1:
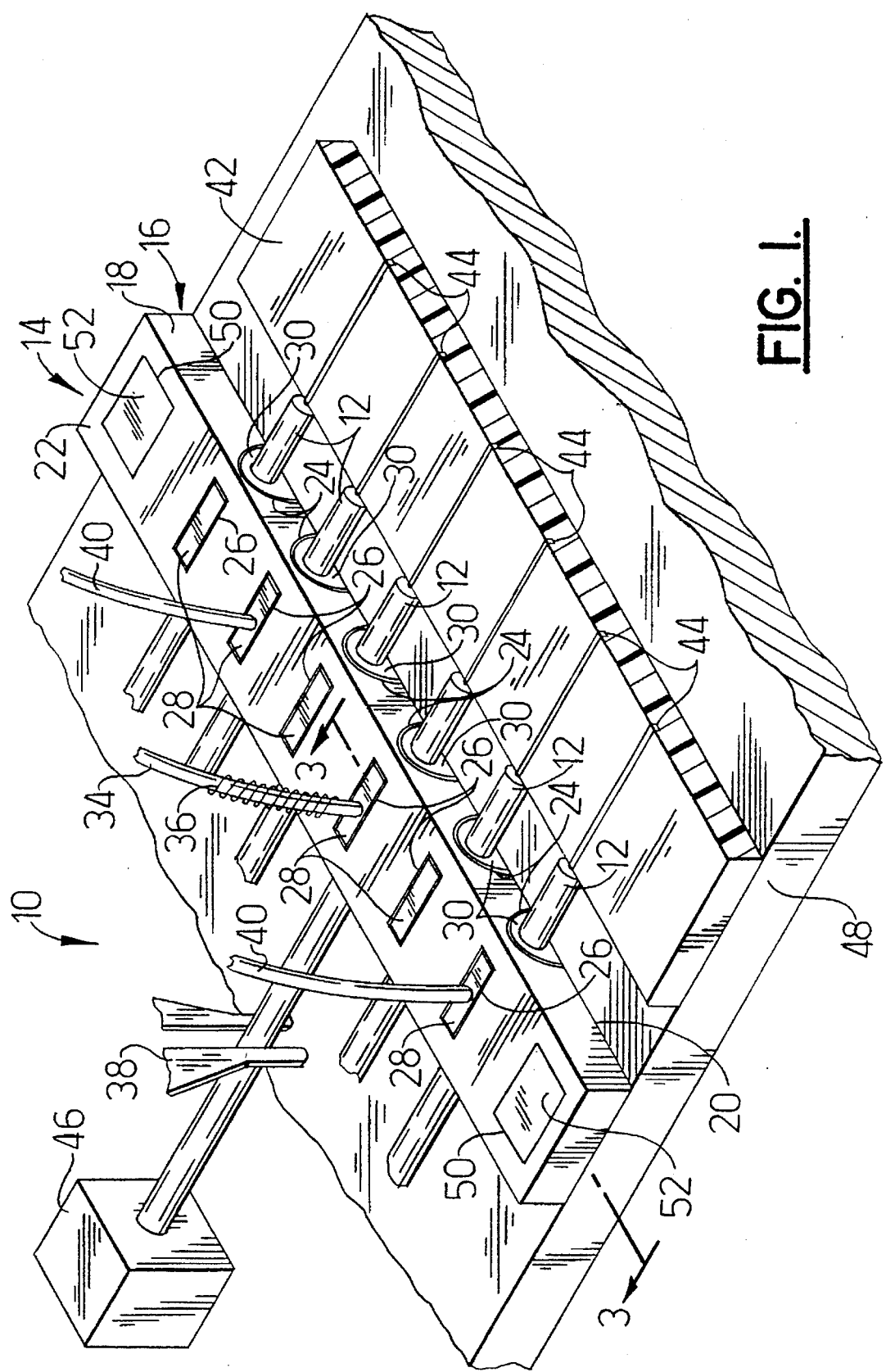
FIG. 1 is a greatly enlarged perspective view of an optical fiber alignment assembly according to the present invention and an alignment fixture and an aligned electro-optic device.

Referring now to FIGS. 1 and 2, an optical fiber alignment assembly 10 for controllably positioning an optical fiber 12 is illustrated. Typically, the outer surface of the optical fiber is metallized, such as with titanium platinum gold or other similar materials which adhere to metals, as known to those skilled in the art. As also known to those skilled in the art, titanium adheres to glass, such as optical fibers; gold adheres to metals, such as solders; and platinum adheres the titanium layer to the gold layer.

The optical fiber alignment assembly includes an alignment fixture 14 having an optical fiber carrier 16. The optical fiber carrier is generally comprised of an insulating substrate 18 comprised of a material having a relatively low thermal conductivity. For example, the substrate can be comprised of alumina ($Al_2O_3$) which has a thermal conductivity of approximately 0.04 W/cm.K. and defines at least one channel 24 extending longitudinally thereacross. In particular, the channel extends inwardly from the first surface of the optical fiber carrier and defines a longitudinal axis. Preferably, the optical fiber carrier defines a plurality of laterally spaced, longitudinally extending channels. Each channel is adapted for receiving respective ones of a plurality of optical fibers 12.

The optical fiber carrier 16 also defines at least one passageway 26 extending inwardly from the second surface 22 of the optical fiber carrier. According to a preferred embodiment illustrated in cross-section in FIG. 3, at least one passageway extends from the second surface of the optical fiber carrier and opens into each channel 24 defined therein. Although one passageway opens into each channel of the optical fiber carrier in the illustrated embodiment, two or more passageways may open into a channel without departing from the spirit and scope of the present invention.

A thermal transfer material 28 is preferably disposed within the passageways 26 defined in the optical fiber carrier 16. The thermal transfer material preferably has a greater thermal conductivity than the optical fiber carrier. For example, the thermal transfer material can be comprised of a copper tab having a thermal conductivity of approximately 4.01 W/cm-K. In addition, the thermal transfer material has a predetermined melting temperature, such as 1080° C. for a copper tab.

The alignment fixture 14 of the present invention also includes an optical fiber bonding material 30 disposed within each channel 24 defined in the optical fiber carrier 16. The optical fiber bonding material is adapted for bonding an optical fiber 12 to the optical fiber carrier and, more particularly, to bonding a respective optical fiber within each channel defined by the optical fiber carrier. In order to form a secure attachment between the optical fiber bonding material and the optical fiber carrier, the channels are preferably coated with several layers 24a of metallic material, such as layers of titanium, platinum and gold or other metallic adhesion materials as known to those skilled in the art.

The optical fiber bonding material 30 has a predetermined melting temperature which is lower than the melting temperature of the substrate 18 and is preferably lower than the melting temperature of the thermal transfer material 28. For example, the optical fiber bonding material can be comprised of a solder, such as Indium Bismuth Tin (InBiSn) having a predetermined melting temperature of approximately 79° C. Accordingly, the optical fiber bonding material is at least partially malleable at temperatures above the predetermined melting temperature such that the optical fibers can be moved within the optical fiber bonding material. Likewise, the optical fiber bonding material is generally solid at temperatures below the predetermined melting temperature such that the position of the optical fiber is fixed therein.

Optical fibers 12 can therefore be secured to the alignment fixture 14 by positioning each optical fiber in the optical fiber bonding material 30 disposed within a respective channel 24. During this initial step, the optical fibers can be partially aligned relative to the optical fiber carrier 16. Thereafter, the position of the optical fiber disposed therein can be readily adjusted relative to the optical fiber carrier.

According to the present invention, the optical fiber bonding material 30 disposed in the channels 24 defined in the optical fiber carrier 16 is in thermal contact with the thermal transfer material 28 disposed in the respective passageways 26 defined in the optical fiber carrier as shown in FIG. 3. Thus, the temperature of the optical fiber bonding material and consequently, the malleability of the optical fiber bonding material can be controlled by adjusting the thermal energy applied to the thermal transfer material.

For example, increases in the thermal energy applied to the thermal transfer material 28 increases the temperature of the thermal transfer material and the optical fiber bonding material 30. By increasing the temperature of the optical fiber bonding material above its predetermined melting temperature, the malleability of the optical fiber bonding material is increased and an optical fiber 12 can be readily positioned therein. Likewise, decreasing or eliminating the thermal energy applied to the thermal transfer material decreases the temperature of the thermal transfer material and the optical fiber bonding material. By decreasing the temperature of the optical fiber bonding material below its predetermined melting temperature, the optical fiber bonding material solidifies and the position of the optical fiber therein is fixed.

In order to obtain a secure affixation of the thermal transfer material 28, such as a copper tab, within each passageway 26, the thermal transfer material is preferably adhered to the sidewalls of each passageway with an adhesive material 32 as shown in FIG. 3. The adhesive material is generally comprised of glass frit which has been vitrified. Thus, the adhesive material does not melt during the application of the thermal energy to the thermal transfer material. For example, the adhesive material can be comprised of a conductive epoxy paste, such as glass frit having a vitrification temperature of 600° C.

Although channels 24 having a generally U-shaped cross-section are illustrated, the channels can have various cross-sectional shapes without departing from the spirit and scope of the present invention. For example, the channels can have a generally V-shaped cross-section or a rectangular cross-section. Generally, each channel of an optical fiber carrier 16 has the same lateral cross-section.

In addition to the alignment fixture 14, the optical fiber alignment assembly 10 illustrated in FIGS. 1 and 2, also preferably includes heating means 34, such as a heating probe, for supplying thermal energy to the thermal transfer material 28. Accordingly, the thermal transfer material and the optical bonding fiber material 30 can be heated above the predetermined melting temperature of the optical fiber bonding material so that the optical fiber bonding material is at least partially malleable and the optical fiber 12 can be positioned therein. The heating probe is typically an electrical probe, such as a resistive heating probe. For example, the heating probe can be comprised of a copper wire having a resistive heating coil 36 wrapped thereabout to heat the copper wire upon the application of electrical current to the heating coil and, in turn, to heat both the thermal transfer material and the optical fiber bonding material.

The optical fiber alignment assembly 10 of FIG. 1 also preferably includes positioning means 38, responsive to the heating means 34, for controllably positioning the optical fibers 12 within the respective channels 24 defined by the optical fiber carrier 16 while the optical fiber bonding material 30 is at least partially malleable. As illustrated, the positioning means can include a fiber clip having a pair of opposed tongs which grip an optical fiber therebetween and which permit controlled movement thereof. Once the optical fiber has been properly positioned, the heating probe can be removed from thermal contact with the thermal transfer material 28 such that the thermal transfer material and the optical fiber bonding material cool. Once cooled, the optical fiber bonding material resolidifies to fix the position of the optical fiber relative to the alignment fixture.

As also illustrated in FIGS. 1 and 2, one embodiment of the optical fiber alignment assembly 10 also includes cooling means 40, such as one or more cooling probes, positioned in thermal contact with the thermal transfer material 28 which is disposed in a passageway 26 adjacent to the passageway in which the heated thermal transfer material is disposed. The cooling probe maintains the temperature of the optical fiber bonding material 30 in the channel adjacent to the channel containing the heated optical fiber bonding material below the predetermined melting temperature of the optical fiber bonding material. Thus, the optical fiber bonding material in the channel with which the cooling means is in thermal contact remains solidified and the position of the optical fiber remains fixed.

Accordingly, the optical fiber bonding material 30 disposed in a first channel can be heated and the optical fiber 12 disposed therein controllably positioned while the optical fiber bonding material disposed in a second channel, adjacent to the first channel, is cooled or maintained at a temperature below the predetermined melting temperature of the optical fiber bonding material. During this process, the position of the optical fiber disposed in the second channel remains fixed. Thus, the position of an optical fiber disposed in the first channel can be controllably adjusted without affecting the position of an optical fiber disposed in the second channel adjacent to the first heated channel.

The cooling of the optical fiber bonding material 30 disposed in channels 24 adjacent to a heated channel is particularly useful with an alignment fixture 14 having optical fibers 12 which are laterally spaced apart by a relatively small distance. For example, optical fibers which are spaced apart by approximately 400 micrometers to approximately 600 micrometers can be controllably positioned according to the method and apparatus of the present invention without adversely affecting the position of or misaligning optical fibers disposed in channels adjacent to the first heated channel.

Preferably, the optical fiber alignment assembly 10 includes first and second cooling probes 40 positioned in thermal contact with the thermal transfer material 28 in the passageways 26 adjacent to and on opposite sides of the passageway in which the heated thermal transfer material is disposed. Accordingly, the temperature of the optical fiber bonding material 30 which is disposed in second and third channels which are adjacent to and on opposite sides of the first heated channel can be maintained at a temperature below the predetermined melting temperature of the optical fiber bonding material, thereby maintaining the optical fibers 12 in the second and third channels in a fixed position.

The cooling probe 40 can also include a wire comprised of a material having a relatively high thermal conductivity, such as a copper wire, which serves as a heatsink to receive and remove heat from the optical fiber bonding material 30 and the thermal transfer material 28.

The positioning means 38 of the optical fiber alignment assembly 10 also preferably includes light source means for providing an optical signal to the optical fiber 12 and to which the optical fiber is aligned. As illustrated in FIG. 1, a light source means can include an electro-optic device 42 which includes at least one electro-optic waveguide 44 for propagating optical signals therethrough. More particularly, the exemplary electro-optic device illustrated in FIG. 1 includes a plurality of electro-optic waveguides, a respective one of which is associated with each of the plurality of optical fibers 12. As known to those skilled in the art, the optical signals propagated through the electro-optic waveguides can be supplied by a variety of sources. In addition, an index guiding ridge 45 is preferably associated with each electro-optic waveguide to guide the light through the waveguide. For example, the optical signals can be supplied by the waveguides in embodiments employing active waveguides, or by one or more laser diodes, or by a variety of other devices known to those skilled in the art.

The positioning means 38 of this embodiment also preferably includes a detector 46, responsive to the light source means, for receiving the optical signals following their propagation through the optical fibers 12 and for detecting the respective strengths thereof. In addition, the positioning means of this embodiment can include means, responsive to the detector, for adjusting the position of the respective optical fibers in response to the detected optical signals to thereby increase the detected strength of the received optical signals. In particular, the relative positions of the optical fibers are generally adjusted to align the optical fibers with a respective light source, such as an electro-optic waveguide 44 as illustrated in FIG. 1, by maximizing the light transmission efficiency of the optical fibers. Thus, the most efficient coupling between the light source and the optical fibers is provided.

In one exemplary embodiment, the detector 46 and the adjusting means includes a single mode fiber aligner which detects the strength of a received optical signal and adjusts the position of the respective optical fiber 12 in response thereto to increase the detected strength of the optical signals. Such single mode fiber aligners generally include a silicon p-i-n photodiode manufactured by EG and G Optoelectronics.

In order to further improve the transmission efficiency of the detected signals, the light source means, such as the electro-optic waveguide 44, is preferably positioned at a fixed location relative to the optical fiber carrier 16. In particular, as illustrated in FIG. 1, both the light source and the alignment fixture 14 can be mounted in fixed positions on a heatsink 48, such as a copper heatsink or a beryllium oxide heatsink plated with nickel gold or metallized with titanium, platinum and gold. Thus, the optical fiber carrier also preferably defines at least one bore 50 extending therethrough from the first side 20 to the opposed second side 22. As illustrated, the optical fiber carrier more preferably defines at least two bores extending through the optical fiber carrier on laterally opposed sides thereof. The bores are adapted to receive an adhesive material 52, such as gold tin (AuSn) solder having a melting temperature of 280° C., which can be melted and subsequently solidified to bond the alignment fixture to the heatsink.

Although the illustrated alignment fixture 14 includes a single row of channels 24 and respective optical fibers 12, the optical fiber alignment assembly 10 of the present invention can be employed with a two-dimensional electro-optic device 42 which includes, for example, a stack of electro-optic devices, each of which include a plurality of laterally spaced optical waveguides 44. In such instances, the optical fiber carrier 16 would also preferably include a two-dimensional arrangement of channels and passageways 26 such that an optical fiber is aligned with each optical waveguide.

Figure 4A:
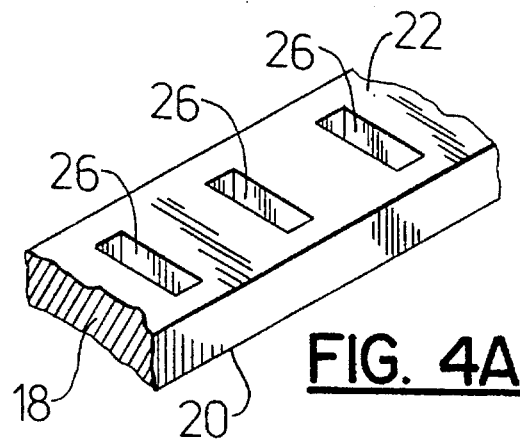
FIGS. 4A–4D are greatly enlarged perspective views of the alignment fixture of the present invention illustrating various operations in its fabrication.
Figure 4B:
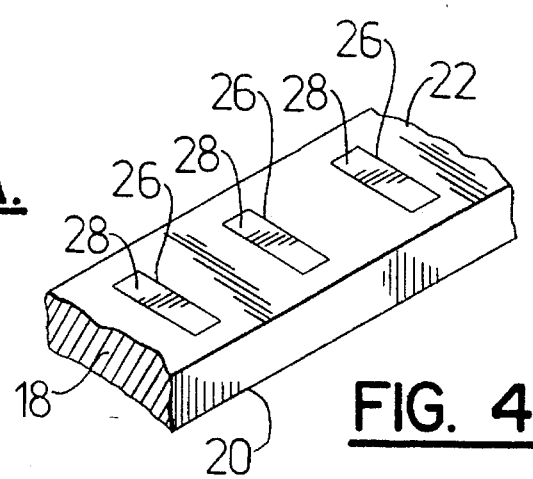
Figure 4C:
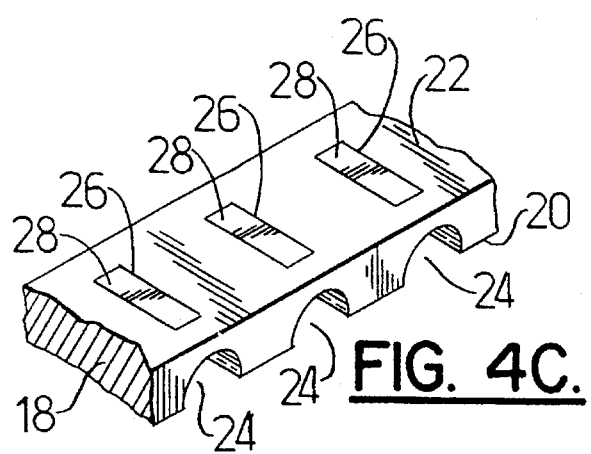
Figure 4D:
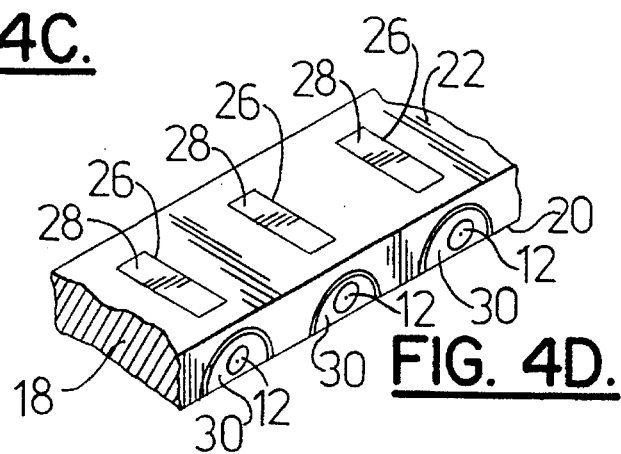

According to another aspect of the present invention, a method of fabricating the alignment fixture is provided, as illustrated in FIGS. 4A–4D. In particular, a plurality of inwardly extending passageways 26 are initially formed from the second surface 22 of the insulating substrate 18 as illustrated in FIG. 4A. These inwardly extending passageways are at least partially filled with a thermal transfer material 28, as described above and as shown in FIG. 4B. Thereafter, a plurality of inwardly extending channels 24 are cut from the first surface 20 of the substrate, as illustrated in FIG. 4C. The channels are also preferably metallized as described above. The plurality of channels are positioned such that at least one of the passageways filled with the thermal transfer material opens into each channel. Thereafter, an optical fiber 12, such as a metallized optical fiber, and optical fiber bonding material 30 are disposed in each channel, as shown in FIG. 4D, such that the optical fiber bonding material is in thermal contact with thermal transfer material. The thus-formed substrate can then be mounted on a heatsink 48 such that the first surface of the substrate is adjacent to the heatsink and the optical fibers disposed in the respective channels are positioned between the substrate and the heatsink.

According to the method and apparatus of the present invention, optical fibers 12 can be controllably positioned within an alignment fixture 14 relative to a light source, such as a plurality of electro-optic waveguides 44, without adversely affecting the position of or misaligning adjacent optical fibers. As described, the method and apparatus of the present invention is particularly useful for positioning closely spaced optical fibers, such as optical fibers which are to be aligned with electro-optic waveguides having a center-to-center lateral spacing of less than 500 micrometers. In addition, the method and apparatus of the present invention is particularly useful for positioning single mode optical fibers and, more particularly, polarization maintaining and polarization preserving optical fibers which are preferably aligned in a predetermined azimuthal orientation relative to the light source.

Furthermore, the method and apparatus of the present invention is particularly useful with respect to relatively small optical fibers, such as optical fibers having an exterior diameter of approximately 125 microns and an optical fiber waveguide or core having a diameter of less than 4 microns, since such relatively small optical fibers are otherwise relatively difficult to align with a light source, such as an electro-optic device. However, it should be apparent that the method and apparatus of the present invention can be employed with relatively large optical fibers and multi-mode optical fibers without departing from the spirit and scope of the present invention.

In the drawings and the specification, there has been set forth a preferred embodiment of the invention and, although specific terms are employed, the terms are used in a generic and descriptive sense only and not for the purpose of limitation, the scope of the invention being set forth in the following claims.

That which is claimed is:

1. An alignment fixture for controllably positioning an optical fiber, the alignment fixture comprising:

an optical fiber carrier defining at least one channel extending thereacross, the channel extending inwardly from a first surface of said optical fiber carrier and defining a longitudinal axis, said optical fiber carrier also defining at least one passageway from a second surface of said optical fiber carrier, opposite the first surface, to the channel;

a thermal transfer material disposed within the passageway defined in said optical fiber carrier, said thermal transfer material having a greater thermal conductivity than said optical fiber carrier; and an optical fiber bonding material disposed within the channel and adapted for bonding the optical fiber to said optical fiber carrier, said optical fiber bonding material having a predetermined melting temperature wherein said optical fiber bonding material is at least partially malleable at temperatures above the predetermined melting temperature so that the optical fiber can be positioned therein and wherein said optical fiber bonding material is solidified at temperatures below the predetermined melting temperature so that the position of the optical fiber is fixed therein, said optical fiber bonding material being in thermal contact with said thermal transfer material such that the malleability of said optical fiber bonding material is controlled by thermal energy applied to said thermal transfer material.

2. An alignment fixture according to claim 1 wherein said optical fiber carrier defines a plurality of laterally spaced, longitudinally extending channels for receiving respective ones of a plurality of optical fibers, said optical fiber carrier also defining a plurality of passageways wherein at least one passageway extends from the second surface of said optical fiber carrier to each of said plurality of channels.

3. An alignment fixture according to claim 2 wherein the respective longitudinal axes defined by said plurality of channels are laterally spaced apart by 400 μm to 600 μm.

4. An alignment fixture according to claim 1 wherein said thermal transfer material comprises a copper tab and wherein said copper tab is adhered to the sidewalls of the passageway with an adhesive material.

5. An alignment fixture according to claim 1 wherein said optical fiber bonding material is comprised of solder.

6. An alignment fixture according to claim 1 wherein said optical fiber carrier also defines at least one bore extending from the first side to the opposed second side and adapted for receiving an adhesive material to bond the alignment fixture to a heatsink.

7. An optical fiber alignment assembly for controllably positioning an optical fiber, the optical fiber alignment assembly comprising:

an alignment fixture comprising:

an optical fiber carrier defining at least one channel extending thereacross, the channel extending inwardly from a first surface of said optical fiber carrier and defining a longitudinal axis, said optical fiber carrier also defining at least one passageway from a second surface of said optical fiber carrier, opposite the first surface, to the channel;

a thermal transfer material disposed within the passageway defined in said optical fiber carrier, said thermal transfer material having a greater thermal conductivity than said optical fiber carrier; and an optical fiber bonding material disposed within the channel and adapted for bonding the optical fiber to said optical fiber carrier, said optical fiber bonding material having a predetermined melting temperature and being in thermal contact with said thermal transfer material;

heating means for supplying thermal energy to said thermal transfer material to thereby heat said thermal transfer material and said optical fiber bonding material above the predetermined melting temperature of said optical fiber bonding material such that said optical fiber bonding material is at least partially malleable; and positioning means, responsive to said heating means, for controllably positioning the optical fiber within the channel defined in said optical fiber carrier while said optical fiber bonding material is at least partially malleable such that the position of the optical fiber is fixed relative to said alignment fixture upon removal of the thermal energy from said thermal transfer material and the resulting solidification of said optical fiber bonding material.

8. An optical fiber alignment assembly according to claim 7 wherein said optical fiber carrier defines a plurality of laterally spaced, longitudinally extending channels for receiving respective ones of a plurality of optical fibers, said optical fiber carrier also defining a plurality of passageways wherein at least one passageway extends from the second surface of said optical fiber carrier to each of said plurality of channels.

9. An optical fiber alignment assembly according to claim 8 further comprising cooling means, positioned in thermal contact with said thermal transfer material which is disposed in a passageway adjacent to the passageway in which said heated thermal transfer material is disposed, for maintaining the temperature of said optical fiber bonding material which is disposed in a channel adjacent to the channel in which said heated optical fiber bonding material is disposed below the predetermined melting temperature of said optical fiber bonding material such that said optical fiber bonding material in the channel with which said cooling means is in thermal contact remains solidified and the position of the optical fiber remains fixed.

10. An optical fiber alignment assembly according to claim 7 wherein said positioning means comprises:

light source means for providing an optical signal to the optical fiber, said light source means being positioned at a fixed location relative to said optical fiber carrier;

a detector, responsive to said light source means, for receiving the optical signal following propagation through the optical fiber and for detecting the strength thereof; and means, responsive to said detector, for adjusting the position of the optical fiber in response to the detected optical signal to thereby increase the detected strength of the received optical signal.

11. An optical fiber alignment assembly according to claim 7 further comprising a heatsink, and wherein said optical fiber carrier also defines at least one bore extending from the first side to the opposed second side and adapted for receiving an adhesive material to bond said alignment fixture to said heatsink.

12. A method of controllably positioning an optical fiber mounted in an alignment fixture, the alignment fixture comprising an optical fiber carrier defining at least one channel extending thereacross, the channel extending inwardly from a first surface of the optical fiber carrier and defining a longitudinal axis, the optical fiber carrier also defining at least one passageway from a second surface of the optical fiber carrier, opposite the first surface, to the channel, the alignment fixture also comprising a thermal transfer material disposed within the passageway defined in the optical fiber carrier, the alignment fixture further comprising an optical fiber bonding material disposed within the channel and adapted for bonding an optical fiber to the optical fiber carrier, the optical fiber bonding material having a predetermined melting temperature and being in thermal contact with the thermal transfer material, the method comprising the steps of:

providing an optical signal with a light source to the optical fiber from a fixed location relative to the optical fiber carrier;

detecting the strength of the optical signal following propagation through the optical fiber;

heating the thermal transfer material above the predetermined melting temperature of the optical fiber bonding material such that the optical fiber bonding material is also at a temperature above the predetermined melting temperature and is at least partially malleable;

positioning the optical fiber within the channel while the optical bonding material is at least partially malleable to thereby increase the detected strength of the optical signals; and resolidifying the optical fiber bonding material to fix the position of the optical fiber in an aligned relationship with the light source.

13. A method according to claim 12 wherein the optical fiber carrier defines a plurality of laterally spaced, longitudinally extending channels for receiving respective ones of a plurality of optical fibers, the optical fiber carrier also defining a plurality of passageways wherein at least one passageway extends from the second surface of the optical fiber carrier to each of the plurality of channels, the method further comprising a step of maintaining the temperature of the optical fiber bonding material which is disposed in a channel adjacent to the channel in which the heated optical fiber bonding material is disposed below the predetermined melting temperature of the optical fiber bonding material such that the optical fiber bonding material remains solidified and the position of the optical fiber remains fixed.

14. A method according to claim 13 wherein said maintaining step comprises a step of cooling the thermal transfer material which is disposed in a passageway adjacent to the passageway in which the heated thermal transfer material is disposed such that the temperature of the thermal transfer material is lower than the predetermined melting temperature of the optical fiber bonding material.

15. A method according to claim 14 wherein said cooling step comprises a step of cooling the thermal transfer material which is disposed in the plurality of passageways adjacent to and on opposed sides of the passageway in which the heated thermal transfer material is disposed.

16. A method of controllably positioning an optical fiber mounted in an alignment fixture, the alignment fixture comprising an optical fiber carrier defining a plurality of laterally spaced channels extending inwardly from a first surface of the optical fiber carrier, the alignment fixture also comprising an optical fiber bonding material, having a predetermined melting temperature, disposed within the plurality of channels and adapted for bonding an optical fiber within a respective one of the plurality of channels, the method comprising the steps of:

heating the optical fiber bonding material, disposed within a first channel, to a temperature above the predetermined melting temperature of the optical fiber bonding material such that the optical fiber bonding material is at least partially malleable;

cooling the optical fiber bonding material disposed within a second channel, laterally adjacent to the first channel, during said heating step such that the optical fiber bonding material disposed in the second channel remains solidified at a temperature below the predetermined melting temperature of the optical fiber bonding material;

positioning the optical fiber within the first channel while the optical fiber bonding material is at least partially malleable; and resolidifying the optical fiber bonding material within the first channel to fix the position of the optical fiber therein.

17. A method according to claim 16 further comprising the steps of:

providing an optical signal with a light source to the optical fiber disposed in the first channel from a fixed location relative to the optical fiber carrier;

detecting the strength of the optical signal following propagation of the optical signal through the optical fiber; and wherein said positioning step comprises the step of positioning the optical fiber within the first channel to increase the detected strength of the optical signal.

18. A method according to claim 16 wherein said cooling step comprises the step of cooling the optical fiber bonding material disposed within a third channel, laterally adjacent the first channel and opposite the second channel, such that the optical fiber bonding material disposed in the third channel remains solidified at a temperature below the predetermined melting temperature of the optical fiber bonding material.

19. A method of fabricating an alignment fixture from a substrate having opposed first and second surfaces, the method comprising the steps of:

forming a plurality of inwardly extending passageways from the second surface of the substrate;

at least partially filling the plurality of passageways with a thermal transfer material, wherein the thermal transfer material has a greater thermal conductivity than the substrate;

cutting a plurality of inwardly extending channels from the first surface of the substrate wherein the plurality of channels are positioned such that at least one of the passageways filled with thermal transfer material opens into each channel; and disposing an optical fiber and an optical fiber bonding material in each channel such that the optical fiber bonding material is in thermal contact with the thermal transfer material which at least partially fills the respective passageway.

20. A method according to claim 19 further comprising the steps of:

forming at least one bore through the substrate from the first surface to the opposed second surface;

mounting the substrate on a heatsink; and at least partially filling at least one bore with an adhesive material to thereby affix the substrate to the heatsink.

21. A method according to claim 20 wherein said mounting step comprises a step of mounting the substrate on the heatsink such that the first surface of the substrate is adjacent the heatsink and the optical fibers disposed in the respective channels are thereby positioned between the substrate and the heatsink.

* * * * *